US007844024B2

(12) United States Patent
Hosokawa et al.

(10) Patent No.: US 7,844,024 B2
(45) Date of Patent: Nov. 30, 2010

(54) SUPPRESSION METHOD OF RADIONUCLIDE DEPOSITION ON REACTOR COMPONENT OF NUCLEAR POWER PLANT AND FERRITE FILM FORMATION APPARATUS

(75) Inventors: Hideyuki Hosokawa, Hitachinaka (JP); Makoto Nagase, Mito (JP); Kazushige Ishida, Hitachi (JP); Yoichi Wada, Hitachinaka (JP); Naoshi Usui, Tsuchiura (JP); Motohiro Aizawa, Hitachi (JP); Motomasa Fuse, Hitachinaka (JP)

(73) Assignee: Hitachi-GE Nuclear Energy, Ltd., Hitachi-shi (JP)

( * ) Notice: Subject to any disclaimer, the term of this patent is extended or adjusted under 35 U.S.C. 154(b) by 0 days.

(21) Appl. No.: 12/364,556

(22) Filed: Feb. 3, 2009

(65) Prior Publication Data

US 2009/0141849 A1    Jun. 4, 2009

Related U.S. Application Data

(62) Division of application No. 12/165,781, filed on Jul. 1, 2008, which is a division of application No. 11/797,344, filed on May 2, 2007, which is a division of application No. 11/181,809, filed on Jul. 15, 2005, now abandoned.

(30) Foreign Application Priority Data

Jul. 22, 2004    (JP) .............................. 2004-214541

(51) Int. Cl.
    *G21C 9/00*    (2006.01)
(52) U.S. Cl. .................... 376/305; 376/306; 376/277
(58) Field of Classification Search ................. 376/305, 376/306, 277
    See application file for complete search history.

(56) References Cited

U.S. PATENT DOCUMENTS

| 4,734,249 A | 3/1988 | Utamura et al. |
| 4,820,473 A | 4/1989 | Ohashi et al. |
| 4,927,598 A | 5/1990 | Nishino et al. |
| 5,093,073 A | 3/1992 | Schenker |
| 5,164,152 A * | 11/1992 | Kim et al. .................... 376/305 |
| 5,245,642 A * | 9/1993 | Lin ............................. 376/310 |
| 5,375,152 A * | 12/1994 | Lin ............................. 376/310 |
| 5,377,245 A | 12/1994 | Uetake et al. |
| 5,715,290 A * | 2/1998 | Uetake et al. ............... 376/306 |
| 6,335,475 B1 | 1/2002 | Nagase et al. |
| 6,487,265 B1 * | 11/2002 | Nakamura et al. .......... 376/305 |
| 6,549,603 B1 | 4/2003 | Ishida et al. |
| 6,605,158 B1 | 8/2003 | Martin |
| 6,635,232 B1 | 10/2003 | Yaita et al. |
| 6,907,891 B2 | 6/2005 | Anazawa et al. |
| 2004/0057549 A1 | 3/2004 | Wada et al. |

FOREIGN PATENT DOCUMENTS

| JP | 55-121197 | 9/1980 |
| JP | 58-79196 | 12/1983 |
| JP | 62-95498 | 1/1987 |
| JP | 62-233796 | 10/1987 |
| JP | 63-15990 | 7/1988 |
| JP | 63-271196 | 11/1988 |
| JP | 5-215893 | 8/1993 |
| JP | 2000-121791 | 4/2000 |
| JP | 2001-074887 | 3/2001 |
| JP | 2002-131473 | 5/2002 |
| JP | 2002-236191 | 8/2002 |
| JP | 2002-296392 | 10/2002 |
| JP | 2004-205245 | 7/2004 |
| WO | 9622605 | 7/1996 |

OTHER PUBLICATIONS

IAEA-TECDOC-1315, "Nuclear power plant outage optimisation strategy", Oct. 2002.
"Nuclear plant startup", John DeArmond, http://yarchive.net/nucke/nuclear_plant_startup.html, accessed Apr. 6, 2008.

* cited by examiner

Primary Examiner—Rick Palabrica
(74) Attorney, Agent, or Firm—Crowell & Moring LLP

(57) ABSTRACT

A method of suppressing deposition of radionuclides on components of a nuclear power plant comprises forming a ferrite film by contacting a first chemical including iron (II) ions, a second chemical for oxidizing the iron (II) ions to iron (III) ions, and a third chemical for adjusting the pH of a processing solution containing a mixture of the first and second chemicals to be 5.5 to 9.0 with the metal member surface in a time period from a finishing stage in decontamination step of removing contaminants formed on the surface of metal member composing the nuclear power plant, and suppressing deposition of radionuclides on the metal member by the ferrite film.

2 Claims, 14 Drawing Sheets

US 7,844,024 B2

SUPPRESSION METHOD OF RADIONUCLIDE DEPOSITION ON REACTOR COMPONENT OF NUCLEAR POWER PLANT AND FERRITE FILM FORMATION APPARATUS

CROSS-REFERENCE TO RELATED APPLICATIONS

This application is a divisional of U.S. patent application Ser. No. 12/165,781, filed Jul. 1, 2008, which is a divisional of U.S. patent application Ser. No. 11/181,809, filed Jul. 15, 2005, which claims priority to Japan Application No. 2004-214541, filed on Jul. 22, 2004, the entire disclosures of which are incorporated herein by reference.

BACKGROUND OF THE INVENTION

1. Field of the Invention

The present invention relates to a method of suppressing deposition of radionuclides on components of a power plant such as a nuclear power plant, and a ferrite film formation apparatus for performing the radionuclide deposition suppression method.

2. Background Arts

For example, in a nuclear power plant of boiling water type reactor (hereunder abbreviated as BWR), the heat generated by fuel is effectively transferred to cooling water by forcibly circulating the cooling water by a primary loop recirculation pump and internal pumps inside the nuclear reactor comprising a reactor pressure vessel and control rods contained therein. Most of the steam generated from the cooling water in this way is used for driving a steam turbine generator, the steam exhausted from the steam turbine is condensed in a condenser, and the condensate condensed in the condenser is almost fully deaerated and supplied again as cooling water of the nuclear reactor. In this case, in the condenser, oxygen and hydrogen generated by decomposition of water by radiation are also almost completely removed. Further, the condensate to be returned to the nuclear reactor is supplied to the nuclear reactor after removing mainly metal impurities by an ion-exchange resin filter and being heated to nearly 200° C., in order to suppress occurrence of activated corrosive products in the nuclear reactor.

Further, since the activated corrosive products are generated inside the rector pressure vessel and at water-contact portions of a recirculation system, stainless steel such as nickel-base metal which is less in corrosion is used for components of the main primary system. Further, for a reactor pressure vessel made of low alloy steel, inside building up of stainless steel is performed, thereby to prevent the low alloy steel from contacting directly with the reactor water. In addition to taking into a consideration the above-mentioned matters, a part of the reactor water is purified by a reactor-water cleanup facility and metal impurities produced slightly in the reactor water are positively removed.

However, even if the above-mentioned measures for corrosion prevention are taken, very slight metal impurities exist inevitably in the reactor water, so that a part of the metal impurities deposits on the surface of a fuel rod as metal oxide. Metal elements deposited on the surface of the fuel rod are irradiated by neutrons radiated from the fuel to cause nuclear reaction, whereby radionuclides such as cobalt 60, cobalt 58, chromium 51, manganese 54, etc are produced. Most of those radionuclides are, as they are, deposited on the fuel rod surface in a state of oxide, however, a part of the radionuclides is solved out into the cooling water according to the solubility of oxides taken in and released again into the reactor water as insoluble solid called cruds. Radioactive substances in the reactor water are removed by a reactor-water purifying system, however, radioactive substances that can not be removed are accumulated on surfaces of water-contact portions of the components while the substances are recirculating in a recirculation system and so on together with the reactor water. As a result, radiations are radiated from the surface of the components, which becomes a cause of radiation exposure on person engaged with regular inspection during the inspection. A dose of radiation exposure under working is managed not to exceed a specified value for each person, however, recently the specified value is raised and there occurs the necessity that the exposure dose for each person is reduced as low as economically possible.

Therefore, various methods such as a method of reducing deposition of radionuclides on piping, a method of reducing the concentration of radionuclides in the reactor water, etc. are studied. For example, there is proposed a method of injecting metal ions such as zinc into the reactor water, forming a dense oxide film including zinc on the water-contact surface of piping of a recirculation system and suppressing to take radionuclides such as cobalt 60, cobalt 58, etc. into the oxide film (Patent literature 1). Further, there is proposed a method of forming a pre-oxidation film under a certain condition on inner surfaces of recirculation system piping and a reactor-water purifying system in which the reactor water flows during operation, before reaching to the condition that the radionuclides are solved out or released (Patent literature 2)

Patent literature 1: JP 58-79196 A
Patent literature 2: JP 62-95498 A

DISCLOSURE OF THE INVENTION

Subject to be Solved by the Invention

The method of injecting metal ions such as zinc into the reactor water as described in Patent literature 1 has a problem that depleted zinc must be used to avoid zinc itself being radioactivated, in addition to the problem that injection of zinc ions must be always continued during operation.

Further, since the method of forming an oxide film described in Patent literature 2 forms the oxide film in an operation-temperature range (250-300° C.) of BWR, for instance, it is found that there are following problems: Namely, according to the study of the inventors, it is found that in the case where material of components to be formed of oxide film is stainless steel, inner oxide film having much chromium component is formed first on the surface of component, and an outer oxide film having less chromium component is formed on the inner oxide film surface. Particularly, in the case of such a double layer structure oxide film, it has such a property that radioactive Co-60 and Co-58 are easily taken in the inner oxide film, and it is found that a suppression effect of radioactive nuclide deposition is not so large.

It is an object of the present invention to effectively suppress deposition of radionuclides on components of a nuclear power plant.

Means for Solving the Above Subject

In order to solve the above subject or achieve the above object, various studies are conducted, as a result, the following is found.

First, when an oxide film is formed in a high temperature atmosphere such as a reactor water temperature range (for example 250–300° C.) during service operation, the diffusion velocity of oxygen generated by radiolysis of water into metal parent material of a component that the oxide film is to be formed, and oxidation velocity of parent material is fast, so that the oxide film (inner layer) formed initially becomes much in chromium component contained in stainless steel.

Secondly, a main component of the oxide film (outer layer) formed on the inner oxide film is iron because iron ions dissolved out from the parent material precipitate in high temperature water beyond the solubility.

Thirdly, when an oxide film is formed in a high-temperature atmosphere such as in a temperature range during service operation, a film structure such as crystal of the outer oxide film formed on the inner oxide film is not always densely formed. Therefore, radionuclides such as cobalt in the reactor water transmit the outer oxide film, and the radionuclides are taken in the inner oxide film in the form that they are replaced by ion components in the inner oxide film.

The experiments conducted by the inventors to get such knowledge are explained, referring to FIGS. 2 to 4. FIG. 2 shows an experimental result about stainless steel in which oxide film is not formed in advance, the experimental result being a deposit amount of Co-58 deposited on a sample, obtained with time passage, by soaking the sample in cooling water under the condition of service operation of BWR. In FIG. 2, the abscissa shows soaking time and the ordinate shows relative values of Co-58 deposit. As shown in FIG. 2, such a tendency is shown that Co-58 deposit increases with passage of soaking time and finally the deposit saturates. This change in Co-58 deposition has a tendency similar to the tendency of oxide film growth. That is, a corrosion rate is fast at an initial time of soaking and a deposition rate of Co-58 also becomes fast because the film growth rate is fast. However, after passage of about 500 hours, the CO-58 deposition rate becomes slow as the film growth rate becomes slow by diffusion resistance of an oxidizing agent in high temperature water due to the grown oxide film.

FIG. 3 shows an experimental result that a sample A that a pre-oxidation film is not formed on stainless steel and a sample B that a pre-oxidation film is formed on stainless steel are soaked in the cooling water under the condition of BWR service operation and relative values of deposit of Co-58 deposited on the samples A and B are compared. In those samples A and B, A1 and B1 each are an inner oxide film that chromium is a main component, and A2 and B2 are each are an outer oxide film that iron is a main component. From this experimental result, it is found that radioactive cobalt is taken in the inner oxide film B of chromium of a main component in the case of pre-oxidation film formed in the high temperature water under the condition of BWR service operation as in the sample B. That is, it is found that a deposition suppression effect of radionuclides is small even if it is tried to suppress taking in of cobalt by forming the pre-oxidation film in the high temperature water under the condition of BWR service operation and making the growth rate of the oxide film formed during the service operation slow. On the contrary, in the case of the sample A that the pre-oxidation film is not formed, it appears that taking in of cobalt is easily occurs in the course of growing of the outer oxide film A2 that iron is a main component. However, by providing the pre-oxidation film as in the sample B, it is found that it becomes difficult to take cobalt into the outer oxide film B2 becoming slow in growth. It is found that the outer oxide films A2 and B2 that iron is a main component are ferrite films (hereunder, referred to as magnetite films) that magnetite is a main component from analysis of laser Raman spectral. From the above-mentioned matters, if it is possible to produce a magnetite film as an oxide film, it is expected to be able to suppress deposition of cobalt.

However, when forming an oxide film in a water of high temperature close to a temperature in a BWR service operation, since it is impossible to suppress having formed an inner oxide film B1 that chromium is a main component through diffusion of dissolved oxygen in the cooling water into the metal parent material, such a problem is left that the inner oxide film B1 becomes a source of taking in radioactive cobalt and it is impossible to suppress deposition of radionuclides.

If it is possible to form only a magnetite film such as the outer oxide film A2, B2 under the temperature condition (for example, 100° C. or lower) that the diffusion rate of dissolved oxygen into metal parent material is slow, it is considered to be able to suppress taking in of cobalt of radionuclides. After forming a magnetite film on a stainless steel surface on the basis of this consideration, it is soaked in the high-temperature water under the condition of BWR service operation and a deposit amount of Co-60 is examined. As a result, it is found possible to suppress greatly the deposit amount of Co as sown in FIG. 4. In FIG. 4, the ordinate shows relative values of deposit of Co-58 of samples C, D, E. The sample C is a sample that a surface of stainless steel is mechanically grinded, the sample D is a sample that a pre-oxidation film is formed on the surface of stainless steel under the condition of BWR service operation, and the sample E is a sample that a magnetite film is formed on the surface of stainless steel at a temperature of 100° C. or less. As it is apparent from FIG. 4, the deposit amount of Co in the sample E in which the magnetite film is formed is greatly suppressed as compared with the samples C and D. Further, as a method of forming the magnetite film, it is not technique of suppressing corrosion of components of a nuclear power plant, but it is technique of forming a ferrite film of magnetic recording medium. However, a method described in JP 63-15990 B can be applied for the method, for instance. Although the method of JP 63-15990 B uses chlorine, however, it is impossible for the components of nuclear power plant to use chlorine from a viewpoint of securing of soundness of the components, so that it is necessary to take a method different from the method of JP 63-15990 B.

The present invention is made to solve the above-mentioned subject and characterized by adsorbing iron (II) ions (ferrous ions) on surfaces of metal members composing a nuclear power plant, oxidizing the adsorbed iron (II) ions to form ferrite films under the temperature condition from a normal temperature to 200° C., preferably from a normal temperature to 100° C., more preferably from 60° C. to 100° C., and suppressing deposition of radionuclides on the metal members by the ferrite films, on the basis of the acknowledge.

According to the above, the ferrite films formed on the surfaces of members composing a nuclear power plant are ferrite films that magnetite is a main component, corresponding to the sample E in FIG. 4, because the temperature at time of forming the films is lower than the temperature in the core service operation. That is, in the case where the temperature at time of ferrite film formation is in a temperature range at time of service operation of the core, since a diffusion velocity of an oxidizing agent (oxidizer) is fast, a conventional inner oxide film that chromium is a main component is formed, and cobalt is taken in there. On the contrary, in the case where the temperature at time of formation of the ferrite film is 60° C. to 100° C. which is low, since the diffusion velocity of the oxidizer is slow, the conventional inner oxide film that chromium is a main component is not formed, but a magnetite film that taking in of radionuclides is less and iron is a main component, corresponding to the sample E in FIG. 4 is formed, whereby it is possible to suppress deposition of radionuclides onto components.

Further, after acting a solution including bivalent iron ion (iron (II) ion) obtained by solving iron in organic acid or carbonic acid onto the surfaces of components, an oxidizer such as oxygen is injected into the solution, whereby it is possible to form the oxide film.

When the radionuclide deposition suppression method according to the present invention is applied, it is preferable for a water-contact surface of a component to be treated to be bare (to have nothing thereon). Particularly, on the surfaces of components having operated for service, oxide films for corrosion prevention are formed by oxygen of an oxidizer produced by radiolysis of water in the cooling water. The oxide film has been formed in a high-temperature range under service operation, so that the oxide film that chromium is a main component has been formed as in the inner oxide film B1 of the sample B in FIG. 3, and radionuclides have been already taken in. Therefore, even if a magnetite film according to the present invention is formed on the oxide film, it is impossible to obtain a sufficient exposure-dose reducing effect thereby.

Therefore, the radionuclide deposition suppression method according to the present invention is preferable to be practiced after termination of a decontamination process such as chemical decontamination and so on conducted commonly in the nuclear power plant. Concretely, it is preferable to practice the method after a termination stage of the decontamination process and before starting the core. That is, the decontamination such as chemical decontamination or the like is a treatment for removing radionuclides deposited on the surfaces of nuclear power plant components in contact with reactor water together with oxide films. Therefore, the radionuclide deposition suppression method according to the present invention is practiced under the condition that surfaces of parent material of components to be treated are exposed by the decontamination, and any natural oxide film does almost not exist. As a result, a magnetite film which is a kind of ferrite film according to the present invention is formed directly on the surface of component, so that it is possible to effectively suppress deposition of radionuclides. Thereby, it is possible to reduce exposure dose at time of regular inspection working.

As components or members that the radionuclide deposition suppression method according to the present invention is applied, components or members composing a reactor-water recirculation system or reactor-water purifying system of a BWR power plant are preferable, but the component or members are not limited thereto. Further, the present invention is not limited to the BWR plant, but it can be applied for suppression technique of radionuclides deposition on components in contact with reactor water in a pressurized water type (PWR) nuclear power plant.

A ferrite film forming apparatus for practicing the radionuclide deposition suppression method according to the present invention comprises a surge tank for storing a processing solution, a recirculation pump for sucking the processing solution in the surge tank, processing solution supply piping for supplying the processing solution sucked by the recirculation pump to piping for film formation, a first chemical tank for storing iron (II) ions to be injected into the processing solution in the processing solution supply piping, a second chemical tank for storing an oxidizer to be injected into the processing solution in the processing solution supply pipe, a third chemical tank for storing a pH adjuster to adjusting the pH of the processing solution in the processing solution supply piping to be 5.5 to 9.0, a processing solution return piping for returning the processing solution to be returned from the piping for film formation to the surge tank, and a heater for heating the processing solution to a temperature of 60-100° C.

Further, when the apparatus is used both as film formation and as chemical decontamination, it is possible to construct the apparatus so as to fluidly communicate a chemical tank for oxidizer and reducer for chemical decontamination of the piping that a film is to be formed to the above-mentioned processing solution supply piping.

EFFECT OF THE INVENTION

According to the present invention, it is possible to effectively suppress deposition of radionuclides on components of a nuclear power plant.

BRIEF DESCRIPTION OF THE DRAWINGS

These objects and other objects and advantages of the present invention will become more apparent upon reading of the following detailed description and the accompanying drawings in which.

DESCRIPTION OF EMBODIMENTS OF THE INVENTION

Figure 1:
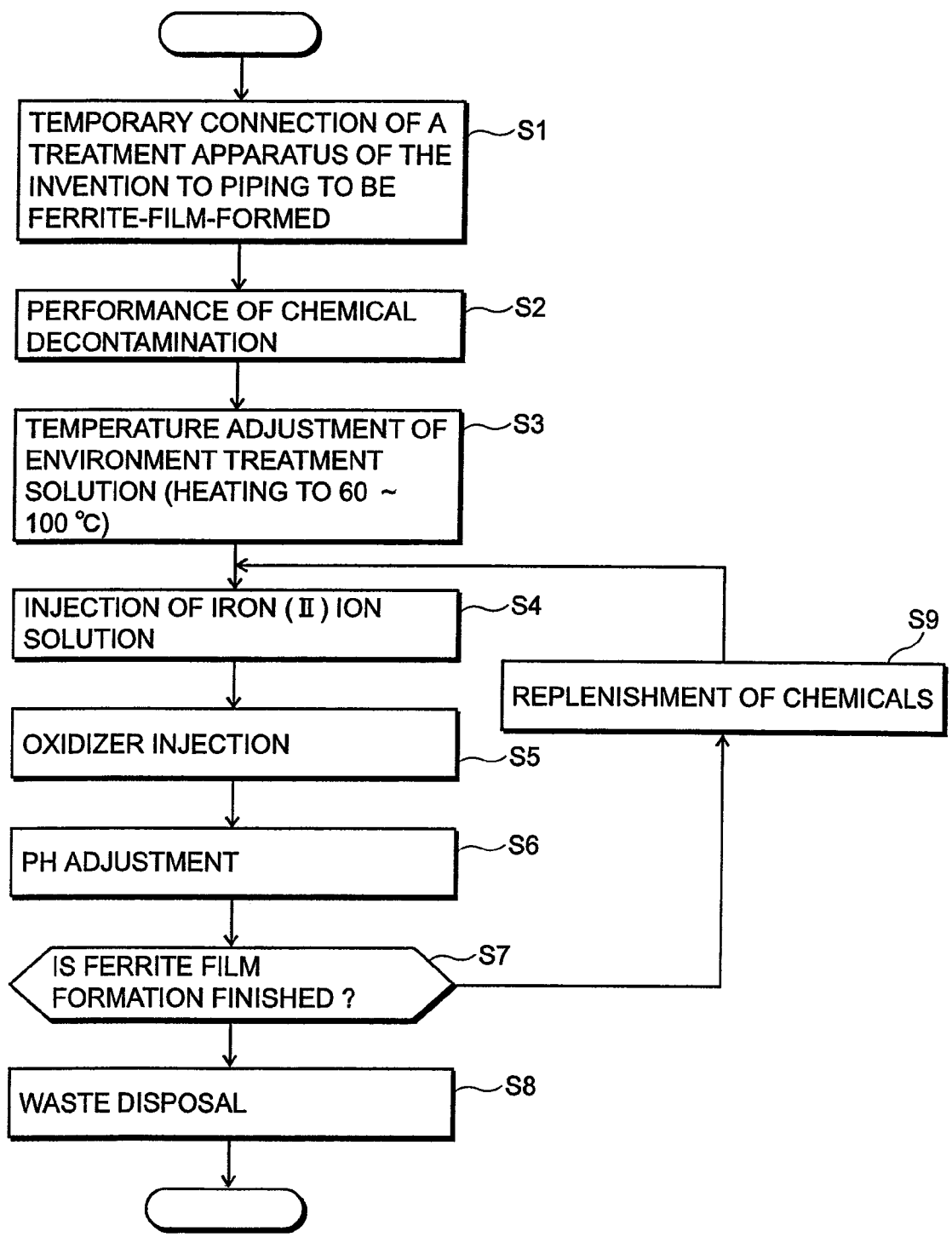
FIG. 1 is a flow chart of an embodiment of a radionuclide deposition suppression method of the present invention.
Figure 2:
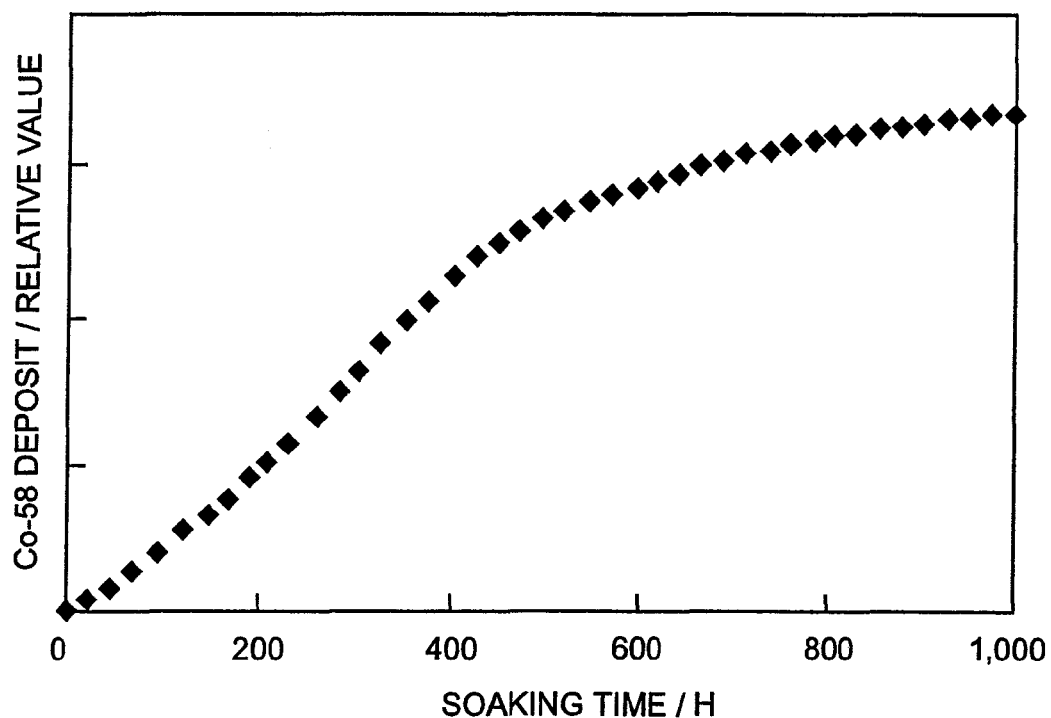
FIG. 2 is a graph showing an experimental result about stainless steel in which pre-oxidation film is not formed, the experimental result being deposit of Co-58 deposited on a sample, obtained with time passage, by soaking the sample in cooling water under the condition of service operation of BWR.
Figure 3:
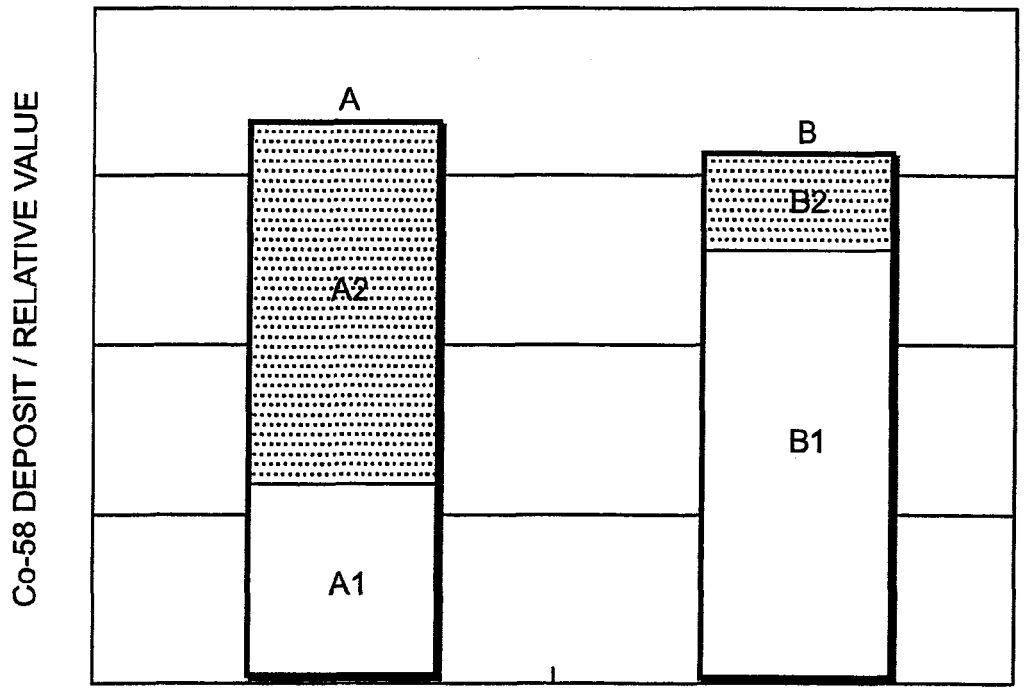
FIG. 3 is a graph showing an experimental result that a sample A that a pre-oxidation film is not formed on stainless steel and a sample B that a pre-oxidation film is formed on stainless steel are soaked in the cooling water under the condition of BWR service operation and relative values of deposit of Co-58 deposited on the samples A and B are compared.
Figure 4:
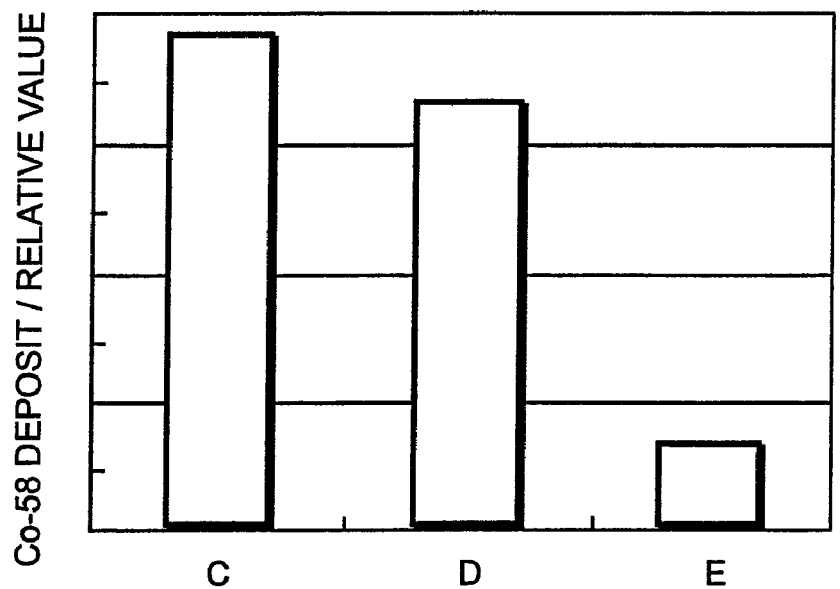
FIG. 4 is a graph showing an experimental result that after forming a magnetite film on a stainless steel surface, it is soaked in the high-temperature water under the condition of BWR service operation and deposit of Co-60 is examined.

Hereunder, embodiments concerning a method of suppressing deposition of radionuclides on components of a nuclear power plant according to the present invention will be explained, referring to the drawings.

First Embodiment

Figure 5:
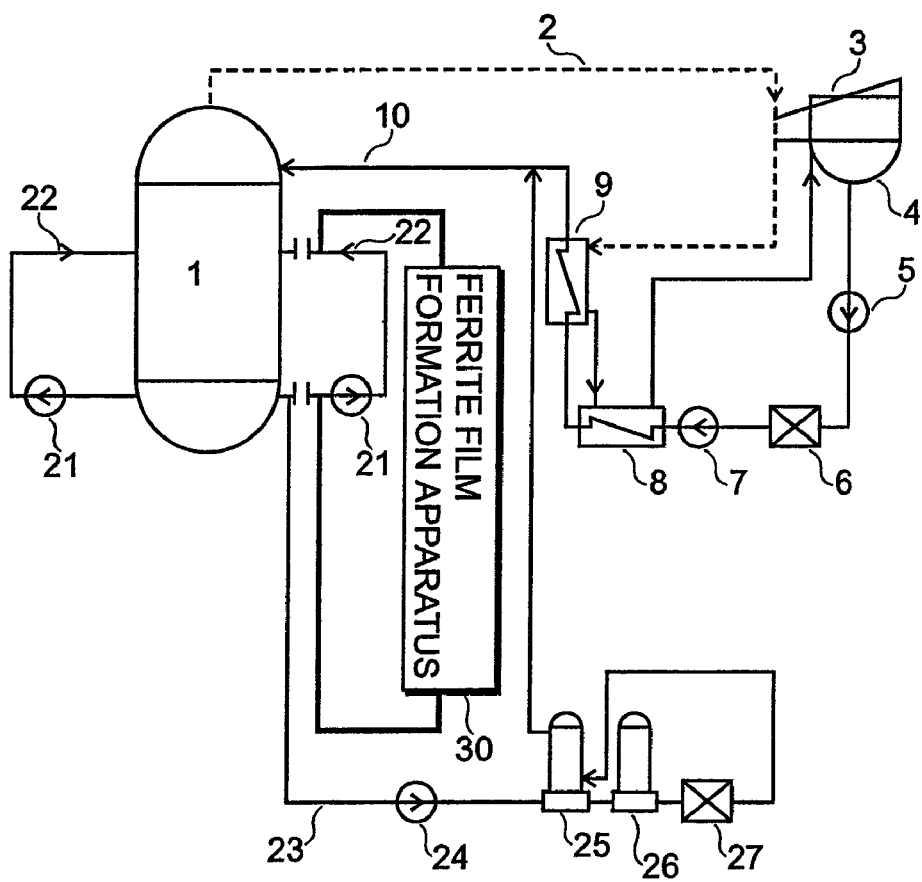
FIG. 5 is a schematic diagram of a whole system construction of an embodiment in which the present invention is applied to recirculation piping of a nuclear power plant.
Figure 6:
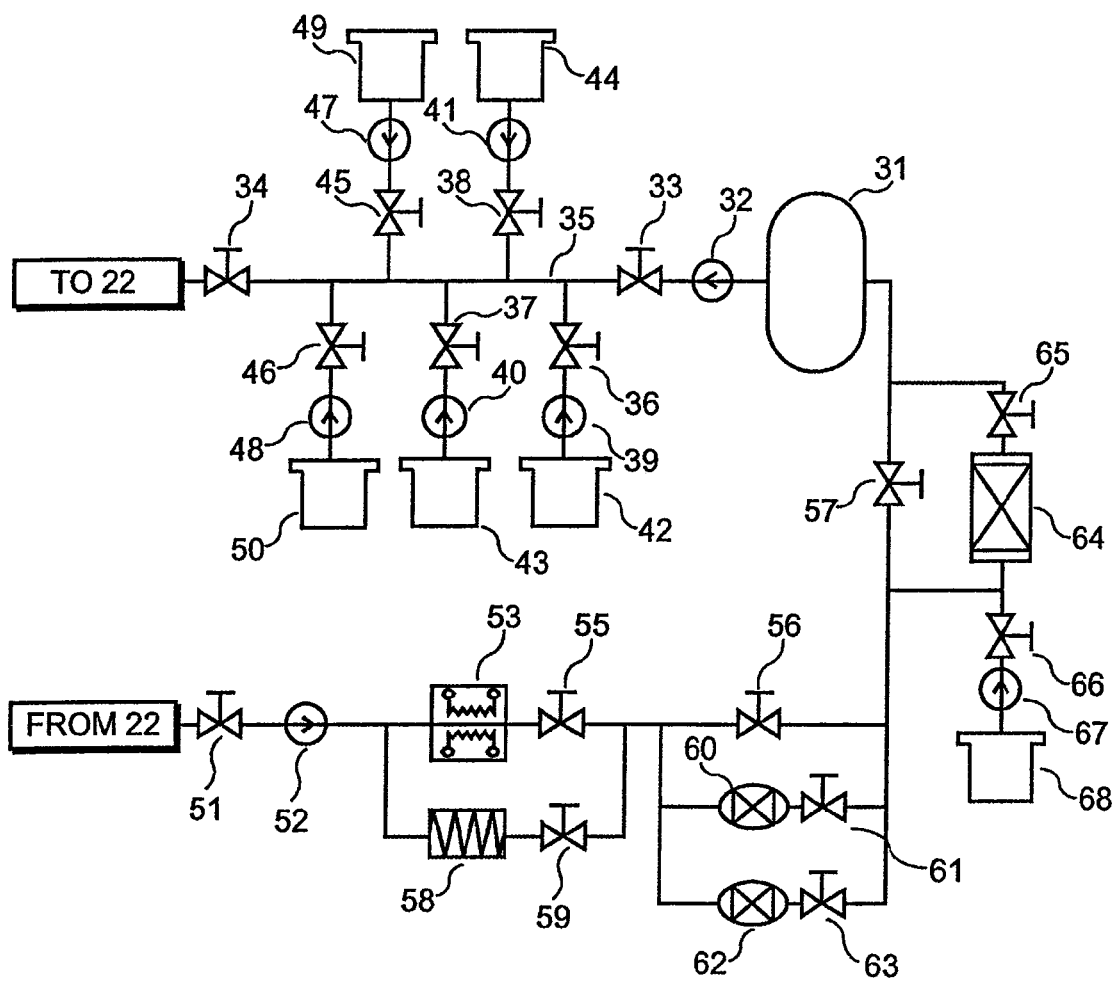
FIG. 6 is a schematic diagram of a detailed system construction of a film forming apparatus for practicing the radionuclide deposition suppression method according to the present invention.

FIG. 1 shows a flowchart of an embodiment of a radionuclide deposition suppression method of the present invention, FIG. 5 shows a schematic diagram of a whole system construction of an embodiment in which the present invention is applied to recirculation piping of a nuclear power plant, and FIG. 6 shows a schematic diagram of a detailed system construction of a film forming apparatus for practicing the radionuclide deposition suppression method according to the present invention.

As shown in FIG. 5, the nuclear power plant comprises a nuclear reactor 1 having fuel rods contained in a pressure vessel, main steam piping 2 connected to the top of the nuclear reactor 1, a steam turbine generator 3 connected to the main steam piping 2, and a condenser 4 connected to a steam outlet of the steam turbine generator 3. The condensate condensed in the condenser 4 is taken out by a condensate pump 5, and returned as feed water for the nuclear reactor 1 through a feed water piping system which comprises a condensate purifying apparatus 6, a feed water pump 7, a low pressure feed water heater 8, and a high pressure feed water heater 9. Heat sources of the low pressure feed water heater 8 and the high pressure feed water heater 9 are extraction steam from the steam turbine generator 3.

Further, a plurality of reactor-water recirculation systems are provided for recirculating cooling water in the nuclear reactor 1, and constructed so that the reactor water extracted by a plurality of recirculation pumps 21 connected to a bottom portion of the nuclear reactor 1 is returned to an upper portion of the nuclear reactor 1 through reactor-water recirculation piping connected to the respective recirculation pumps, thereby to be recirculated. Further, a reactor-water purifying system for purifying the reactor water in the nuclear reactor 1 is constructed so that the reactor water extracted by a purifying system pump 24 connected to the bottom portion of the nuclear reactor 1 is cooled through a regenerative heat exchanger 25 and a non-regenerative heat exchanger 26, and the cooled reactor water is purified by a reactor-water purifying apparatus 27 and returned into the nuclear reactor 1 from a downstream side of the high pressure feed water heater of the feed water piping system after rising the temperature of the purified reactor water by the regenerative heat exchanger 25. Further, FIG. 5 shows the case where the present invention is applied to the reactor-water recirculation system, and the state that a ferrite film formation apparatus 30 for practicing the radionuclide deposition suppression method according to the present invention is connected to the reactor-water recirculation system by temporary piping. That is, when a service operation of the nuclear reactor 1 is stopped, connection between the nuclear reactor 1 and the reactor-water recirculation piping 22 is cut off, and the ferrite film formation apparatus 30 is connected to the cut-off reactor-water recirculation system though the temporary piping so that a processing solution can be recirculated.

An embodiment of the ferrite film formation apparatus 30 is shown in FIG. 6. The film formation apparatus 30 of the present embodiment is constructed so that it can be jointly used with chemical decontamination processing. Namely, the apparatus 30 comprises a surge tank 31 filled with water used for processing, and a recirculation pump 32 for extracting the water in the surge tank 31 and feeding it to an end of the reactor-water recirculation piping 22 through valves 33, 34. Chemical tanks 42, 43 and 44 each used for chemical decontamination are connected to a processing solution piping 35 having the valves 33 and 34 connected thereto through valves 36, 37 and 38 and injection pumps 39, 40 and 41. In the chemical tank 42, permanganic acid ions for oxidative dissolution of contaminated substances inside the piping are stored. In the chemical tank 43, oxalic acid for reductive dissolution of contaminated substances in the piping is stored. In the chemical tank 44, hydrazine for pH adjustment is stored. Further chemical tanks 49 and 50 each used for ferrite film formation are connected to the processing solution piping 35 through valves 45 and 46 and injection pumps 47 and 48. In the chemical tank 49, chemicals including iron (II) ions prepared by dissolving iron with formic acid are stored. Further, chemicals for dissolving iron are not limited to the formic acid, but organic acid or carbonic acid, which becomes counter anion to the iron (II) ion, can be used therefor. In the chemical tank 50, water in which oxygen as oxidizing agent is dissolved is stored. Further, hydrazine stored in the chemical tank 44 is used for pH adjustment at time of ferrite film formation.

Meanwhile, the processing solution fed to the one end of the reactor-water recirculation piping 22 by the recirculation pump 32 is passed through an inside of the reactor-water recirculation piping 22 and returned to the valve 51 from the other end. The processing solution returned through the valve 51 is returned to the surge tank 31 through a recirculation pump 52, a heater 53 and valves 55, 56 and 57. A cooler 58 and a valve 59 are connected to the heater 53 and the valve 55 in parallel. The valve 56, a cation exchange resin tower 60 connected to a valve 61 in series and a mixed bed ion exchange resin 62 connected to a valve 63 in series are connected to the processing solution piping 35 in parallel, respectively. Decomposition equipment 64 is connected in parallel with a valve 57 via a valve 65. A chemical tank 68 is connected to the decomposition equipment 64 via a valve and an injection pump 67, and constructed so that the hydrogen peroxide solution stored in the chemical tank 68 can be injected into the decomposition equipment 64.

It is preferable that the position of the valve 46 for oxidizer injection is at a downstream side of the valve 45 for iron (II)

ion injection and the valve 38 for pH adjuster injection, and possibly close to an object to be treated. Further, it is preferable to set a filter at an exit side of the surge tank 31. Further, it is preferable for removing oxygen in solution to bubble inert gas such as nitrogen, argon gas, etc. in the chemical tank storing chemicals including iron (II) ions, the chemical tank 44 storing pH adjusting chemicals, and the surge tank 31. Further, the decomposition equipment 64 is constructed so that organic acid used as counter anion of iron (II) ion and hydrazine of pH adjuster can be decomposed. That is, as the counter anion of iron (II) ion, organic acid which can be decomposed into water and carbon dioxide taking into consideration of reduction in waste amount, or carbonic acid which can be released as gas and does not increase an amount of wastes is used. Further, it is preferable for suppressing a use amount of chemicals to recover unreacted chemicals by separating and removing excessive reaction products and reuse them.

Using the film formation apparatus 30 constructed as mentioned above, a processing procedure for practicing the radionuclide deposition suppression method according to the present invention in the reactor-water recirculation system will be explained along the flowchart of FIG. 1. First of all, in practice of the method of the present invention, it starts from connection of the film formation apparatus 30 to the piping system including a component that a film is to be formed (S1). For example, as in FIG. 5, in the case where the reactor-water recirculation system is to be treated, connection of the nuclear reactor 1 and the reactor-water recirculation piping 22 is cut off, and the film formation apparatus 30 is connected to the cut-off reactor-water recirculation system through temporary piping.

Next, in the present embodiment, contaminated substances such as oxide films taken in radionuclides formed on the metal member surfaces in contact with the reactor water are decomposed by chemical processing, using the film formation apparatus 30 (S2). When the radionuclide deposition suppression method of the present invention is practiced, it is preferable to conduct the chemical processing, however, it is not limited to the chemical processing. It is necessary that the metal member surface or surfaces are exposed before practicing the radionuclide deposition suppression method, and it is possible to employ mechanical decontamination such as grinding.

The chemical decontamination in step S2 is a conventional method, however, it will be explained briefly. First, the valves 33, 34, 51, 55, 56 and 57 are opened, under the condition that the other valves are closed, the recirculation pumps 32 and 51 are started, and the processing solution in the surge tank 31 is recirculated into the reactor-water recirculation system 22 that is to be chemically decontaminated. Further, the temperature of the processing solution is raised to a temperature of about 90° C. by the heater 53. Next, the valve 36 is opened and the injection pump 39 is started, permanganic acid ions in the chemical tank 42 is injected into the processing solution. Thereby, radioactive contaminant such as oxide films formed on the object that is to be decontaminated is oxidatively dissolved.

After the oxidative dissolution of radioactive contaminant is finished in this manner, in order to decompose permanganic acid remained in the processing solution, the valve 37 is opened and the injection pump 40 is started, and oxalic acid in the chemical tank 43 is injected into the processing solution. Successively, in order to conduct reductive dissolution of the contaminant, the oxalic acid in the chemical tank 43 is further injected into the processing solution, and in order to adjust the pH of the processing solution, the valve 38 is opened and the injection pump 41 is started, and hydrazine is injected from the chemical tank 44 into the processing solution. After oxalic acid and hydrazine are injected in this manner, the valve 61 is opened and the valve 56 is closed, the processing solution is passed to the cation exchange resin tower 60, the metal cation dissolved into the processing solution is adsorbed on the cation exchange resin and removed from the processing solution.

After, the reductive dissolution is finished, in order to decompose the oxalic acid in the processing solution, the opening of the valve 57 for bypassing the valve 65 at the exit side of the decomposition equipment 64 and the decomposition equipment 64 is adjusted, whereby a part of the processing solution is flowed into the decomposition equipment 64. At this time, the valve 66 is opened, the injection pump 67 is started, and hydrogen peroxide in the chemical tank 68 is injected into the processing solution flowing into the decomposition equipment 64, whereby the oxalic acid is decomposed in the decomposition equipment 64. After the oxalic acid is decomposed, in order to remove the impurities in the processing solution, the heater is turned off and the valve 55 is closed. At the same time, the valve 59 of the cooler 58 is opened and the processing solution is passed into the cooler 58 to be lowered in temperature. After the temperature of the processing solution is lowered to a temperature (for example 60° C.) at which it can be passed though the mixed bed resin tower 62 in this manner, the valve 61 of the cation exchange resin tower 60 is closed and the valve 63 at the side of the mixed bed resin exchange tower 62 is opened, and the processing solution is flowed into the mixed bed ion exchange tower 62, thereby to remove impurities in the processing solution.

Those series of operations from temperature elevation, oxidizer dissolution, oxidizer decontamination, reductive dissolution, reductive decomposition and purifying operation are repeated twice or thrice, whereby contaminants including oxide films of the metal member that is to be decontaminated are dissolved and removed.

In this manner, after the contaminants including oxide films of the metal members are removed, the processing is changed to a ferrite film forming processing according to the present invention. First, after finishing of the final purification operation, the processing solution is adjusted to be a prescribed temperature by the heater 53 (S3). The prescribed temperature at this time is preferable to be around 100° C., however, it is not limited to the temperature. The point is that the formed ferrite film is sufficiently dense in film structure such as crystal to the extent that radionuclides in the reactor water during service operation of the nuclear reactor cannot be taken in. Therefore, at least, 200° C. or lower is preferable and although the lower limit is sufficient to be a normal temperature, 60° C. or higher at which a forming rate of the film becomes in a practical range is preferable.

Figure 7:
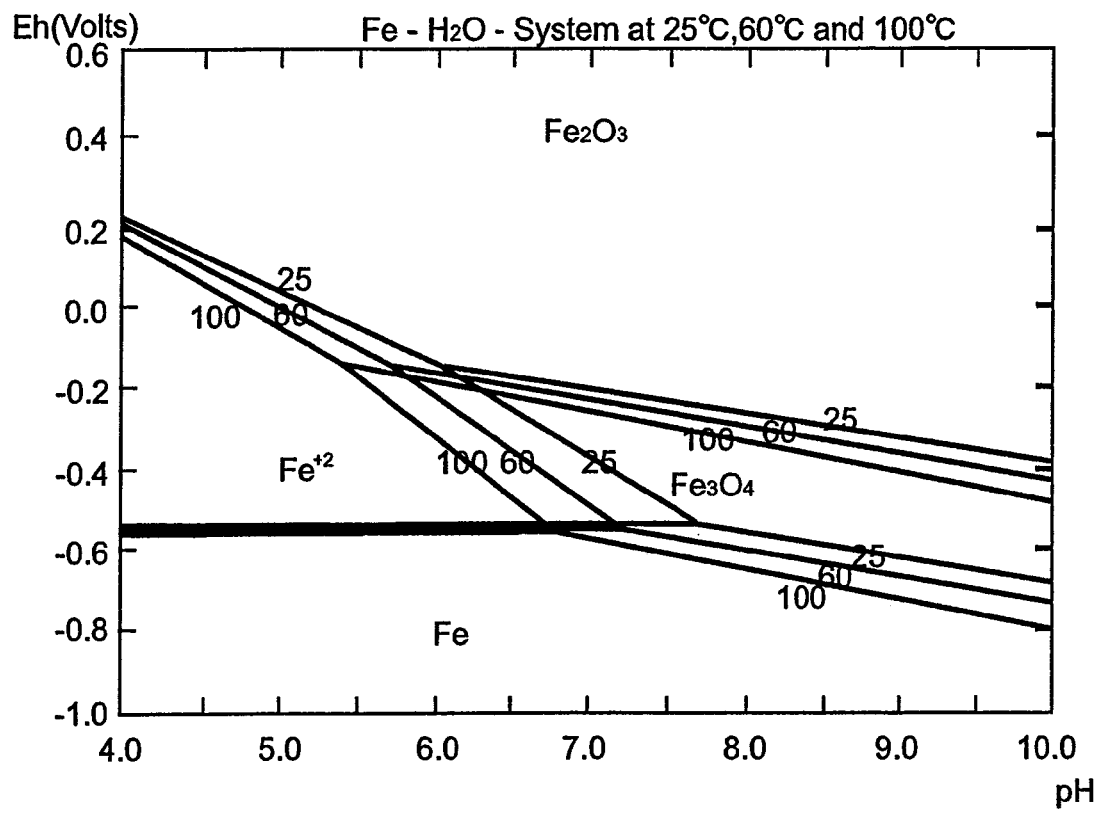
FIG. 7 is a graph showing relationship between voltage and pH in an iron-water system, calculated by saturated solubility 0.065 g/100 g in atmospheric saturated water at 25° C. of iron(II) carbonate-iron concentration of water $5.6 \times 10^{-3}$ mol/L.

Further, from a view point of suppression of a use amount of chemicals also, the temperature of the processing solution for forming a ferrite film is preferable to be 60-100° C. The reason is explained. FIG. 7 shows relationship between voltage and pH in an iron-water system, calculated by saturated solubility 0.065 g/100 g in atmospheric saturated water at 25° C. of iron(II) carbonate-iron concentration of water $5.6 \times 10^{-3}$ mol/L. From FIG. 7, it is found that a stabilized region of magnetite ($Fe_3O_4$) which is a kind of ferrite is expanding to a low pH side as the temperature rises from 25° C. to 60° C., and from 60° C. to 100° C. Therefore, it is possible to reduce an amount of chemical for adjusting the pH of the processing solution by raising the temperature. In order to form a ferrite film, it is necessary that iron (II) ion is adsorbed on the surface of an object that a film is to be formed. However, iron (II) ion in the solution is oxidized to iron (III) ion by dissolved oxygen according to the following chemical formula 1, the iron (III) ion is precipitated as iron hydroxide according to the following chemical formula 2 because the iron (III) ion is lower in solubility than iron (II) ion, so that the iron (III) ion comes not to contribute to ferrite film formation. Therefore, it is preferable to conduct bubbling of inert gas or vacuum deaeration in order to remove oxygen in the processing solution.

$$4Fe^{2+} + O_2 + 2H_2O \rightarrow 4Fe^{3+} + 4OH^- \quad (1)$$

$$Fe^{3+} + 3OH^- \rightarrow Fe(OH)_3 \quad (2)$$

When the temperature of the processing solution recirculated in this manner reaches a prescribed temperature, the valve 45 is opened and the injection pump 47 is started, chemicals containing iron (II) ion prepared by dissolving and adjusting iron by formic acid are injected into the processing solution from the chemical tank 49 (S4). Thereby, the iron (II) ion is adsorbed on the metal member surface that is to be treated. Successively, in order to oxidize the iron (II) ion adsorbed on the metal member surface to be iron (III) ion and to make it into ferrite, the valve 46 is opened and the injection pump 48 is started, whereby water having oxygen of oxidizer dissolved therein and stored in the chemical tank 50 is injected into the processing solution (S5). Successively, in order to adjust the pH of the processing solution to 5.5-9.0, the valve 38 is opened and the injection pump 41 is started, and hydrazine is injected from the chemical tank 44 into the processing solution (S6). Thereby, an oxide film of ferrite film (hereunder, referred to as magnetite film) that magnetite is a main component is formed on the position of an object to be treated.

In step S7, when formation of the magnetite film is finished in this manner, the processing goes to a waste solution processing step S8. However, when the magnetite film formation is not finished, the processing goes to step S9 where chemicals are filled, and then a magnetite film of necessary thickness is formed.

Since formic acid and hydrazine remain in the processing solution after forming of the magnetite film, it is necessary to have removed these impurities by practicing the waste liquid treatment in step S8 when the waste solution is discharged. Meanwhile, disposal of those impurities in the ion exchange resin tower 60 increases waste of the ion exchange resin. Therefore, in the waste liquid treatment in step S8, it is preferable to decompose and dispose the formic acid to carbon dioxide and water, and the hydrazine into nitrogen and water, using the decomposition equipment 64 in the decontamination system. Thereby, it is possible to reduce a load of the ion exchange resin tower 60 and to reduce a waste amount of the ion exchange resin. Further, since the decomposing disposal causes a part of the processing solution to flow in the decomposition equipment as in the decomposition of oxalic acid, formic acid and hydrazine are decomposed by adjusting the openings of the valve 57 bypassing the decomposition equipment 64 and the valve 65 of the decomposition equipment 64, and injecting hydrogen peroxide into the processing solution flowing in the decomposition equipment 64. In this manner, by forming the magnetite film on the object to be treated while suppressing the waste of ion exchange resin and a generation amount of radioactive waste, it is possible to suppress deposition of radionuclides or radioactive cobalt ions on the object to be treated during normal service operation of the nuclear reactor. As a result, it is possible to reduce exposure at time of regular inspection by suppressing a dose rate of the piping of the reactor-water recirculation system.

Further, chemicals such as chlorine are not used for the film formation processing, so that the soundness of components of the nuclear power plant is not spoiled.

Second Embodiment

Figure 8:
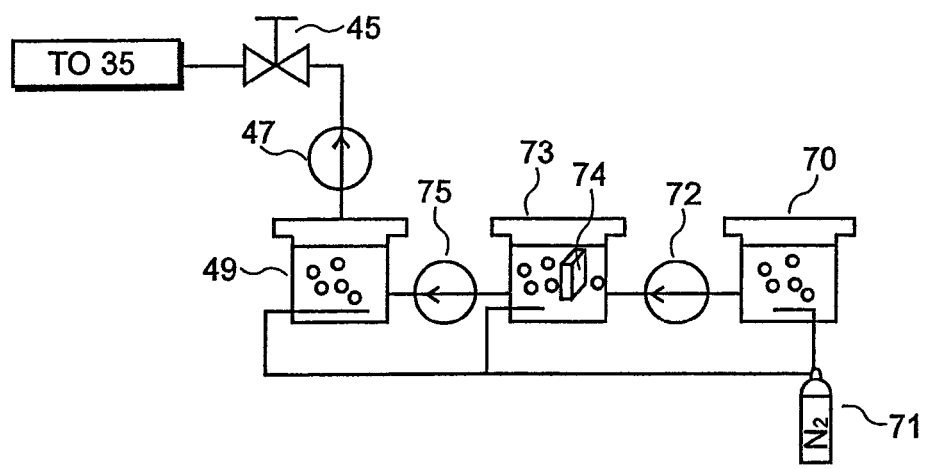
FIG. 8 is a schematic diagram of a partial system of a characteristic portion of another embodiment of a film forming apparatus according to the present invention.

FIG. 8 shows a system of a concrete embodiment of a portion forming iron (II) ions stored in the chemical tank 49 shown in FIG. 6. In FIG. 8, formic acid solution is stored in a chemical tank 70, and nitrogen from nitrogen bubbling equipment 71 is bubbled in the chemical tank 70, whereby dissolved oxygen is removed. The formic acid from which the dissolved oxygen is removed is transferred to a metal iron dissolution tank 73 by an injection pump 72. Metal iron 74 is set in the metal iron dissolution tank 73, and iron (II) ion is dissolved by the formic acid transferred thereto. At this time, nitrogen from the nitrogen bubbling equipment 71 is bubbled in the metal iron dissolution tank 73. The formic acid solution in the metal iron dissolution tank 73 does not substantially include dissolved oxygen, so that the iron (II) ion is almost not oxidized to iron (III) ion. The formic acid solution which dissolved the iron (II) ion is transferred to the chemical tank 49 by an injection pump 75 and stored therein. Further, nitrogen from the nitrogen bubbling equipment 71 is bubbled in the chemical tank 49. Nitrogen from the nitrogen bubbling equipment 71 is bubbled also during storage, and prevents the iron (II) ion from being oxidized to Iron (III) ion by oxygen in the air.

The iron (II) ion solution formed and stored in this manner is used for the film formation processing of the first embodiment shown in FIG. 6. Therefore, the iron (II) ion solution prepared according to the embodiment of FIG. 8 is not in contact with oxidizer until the solution is mixed with the oxidizer such as oxygen to be injected from the chemical tank 50 in the film formation apparatus 30, so that an amount of the iron (II) ion as it is becomes much. Therefore, the amount of iron (II) ion adsorbed on the object portion to be treated increases and the formation reaction of magnetite film becomes easy to occur.

Third Embodiment

Figure 9:
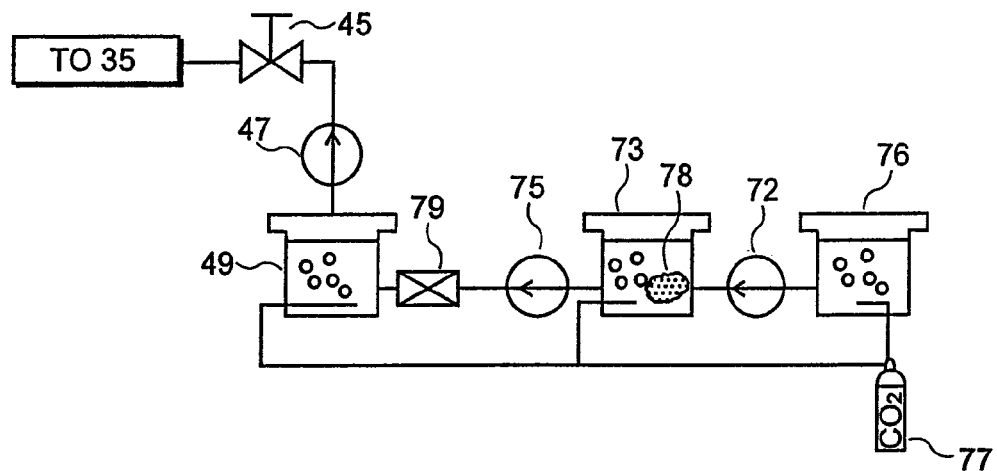
FIG. 9 is a schematic diagram of a partial system of a characteristic portion of another embodiment of a film forming apparatus according to the present invention.

FIG. 9 shows a system of another embodiment of iron (II) ion formation shown in FIG. 8. In the present embodiment, carbonic water instead of formic acid in the embodiment of FIG. 8 is used as an iron ion solution. Carbonic acid is stored in a chemical tank 76, carbon dioxide supplied form a carbon dioxide bubbling equipment 77 is bubbled into the chemical tank 76, and saturated carbonic water of one atmosphere is formed. The formed one atmosphere saturated carbonic water is transferred to the metal iron dissolution tank 73 by the injection pump 72. Iron (II) carbonate 78 is contained in the metal iron dissolution tank 73, and the one atmosphere saturated carbonic water is dissolved. Further, carbon dioxide from the carbon dioxide bubbling equipment 71 is bubbled into the metal ion dissolution tank 73. By the way, according to the literature (Chemical Unabridged Dictionary 5, page 729 (1997), Reduced-size edition), usually, the solubility of iron (II) carbonate is 0.065 g/100 g-water at 20° C., however, in the case of one atmosphere saturated carbonic water, the solubility rises to 0.1 g/100 g-water. Further, it can exhaust dissolved oxygen and does not substantially contain dissolved oxygen, so that the dissolve iron (II) ion is almost not oxidized to iron (III) ion. The saturated carbonic water solution in which iron (II) ion is dissolved is transferred to and stored in the chemical tank 49 by the injection pump 75 via a filter 79 removing undissolved iron (II) ion. During storage, also, carbon dioxide from carbon dioxide bubbling equipment 77 is bubbled into the chemical tank 49, whereby the iron (II) ion is prevented from being oxidized to be iron (III) ion by oxygen in the air.

The iron (II) ion solution produced and stored in this manner is used for the film formation processing shown in FIG. 6. Since the iron (II) ion solution prepared in the embodiment shown in FIG. 9 does not contact with oxidizer until it is mixed with the oxidizer such as oxygen injected from the chemical tank 50 in the film formation apparatus 30, an amount of iron (II) ion as it is and reached to an object portion to be treated becomes much. Therefore, an amount of iron (II) ion adsorbed on the object portion to be treated increases, and the reaction of magnetite film production becomes easy to occur. Further, since carbonic acid ion is used as counter anion of iron (II) ion, it is possible to reduce an amount of solid waste.

Fourth Embodiment

Figure 10:
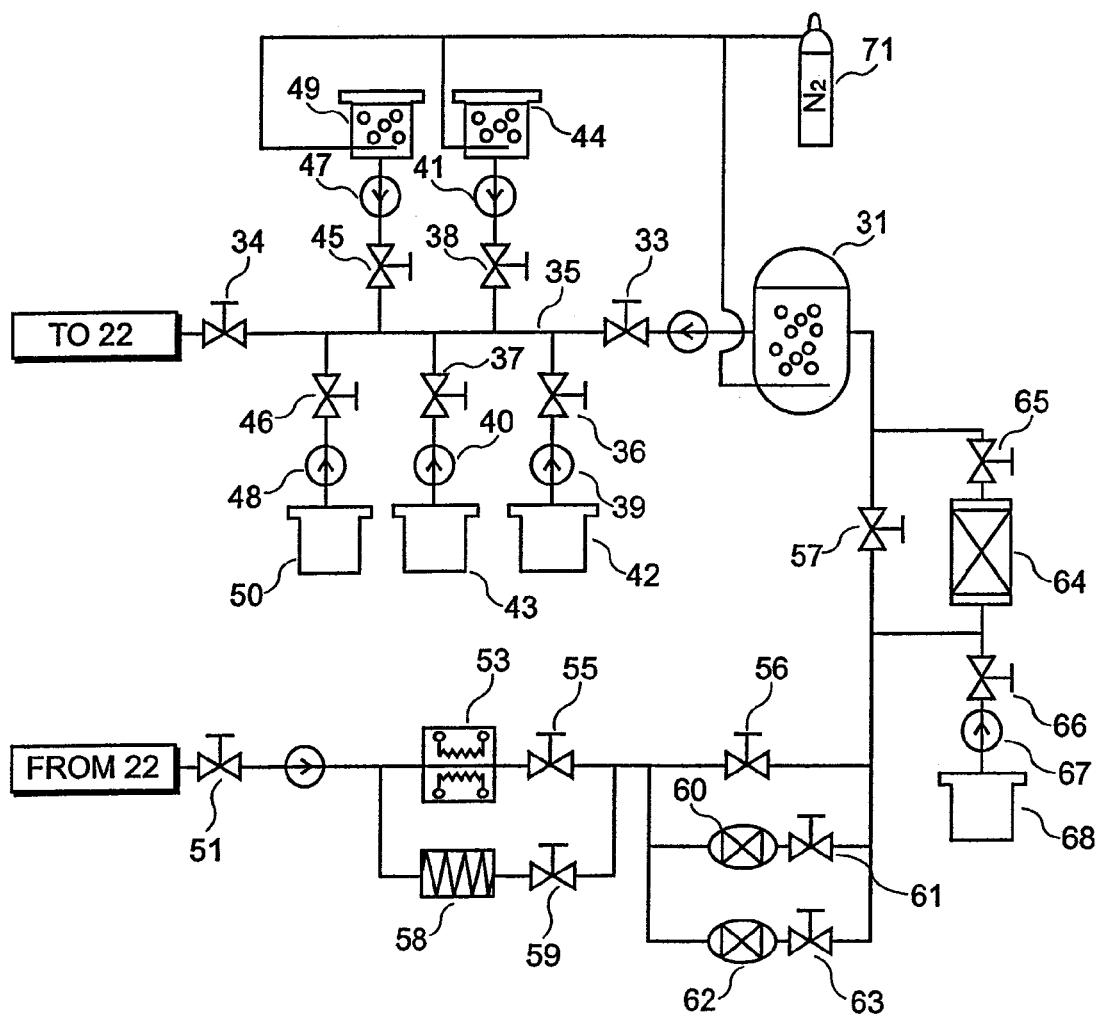
FIG. 10 is a schematic diagram of a system of another embodiment of a film forming apparatus according to the present invention.

FIG. 10 shows a system of another embodiment of the film formation apparatus 30 according to the present invention. A difference of the present embodiment from the embodiment shown in FIG. 6 is that the nitrogen bubbling equipment 71 is connected to each of the surge tank 31, the chemical tank 44 for hydrazine and the chemical tank for iron (II) ion. Thereby, it is possible to make each solution contained in each tank into the solution substantially not containing oxygen by exhausting dissolved oxygen in each tank. As a result, it is possible to reduce formation of iron (III) ion contained in the solution and not distributed to magnetite film formation and to suppress decrease in magnetite film formation reaction, as well as the above-mentioned second and third embodiments.

Fifth Embodiment

Figure 11:
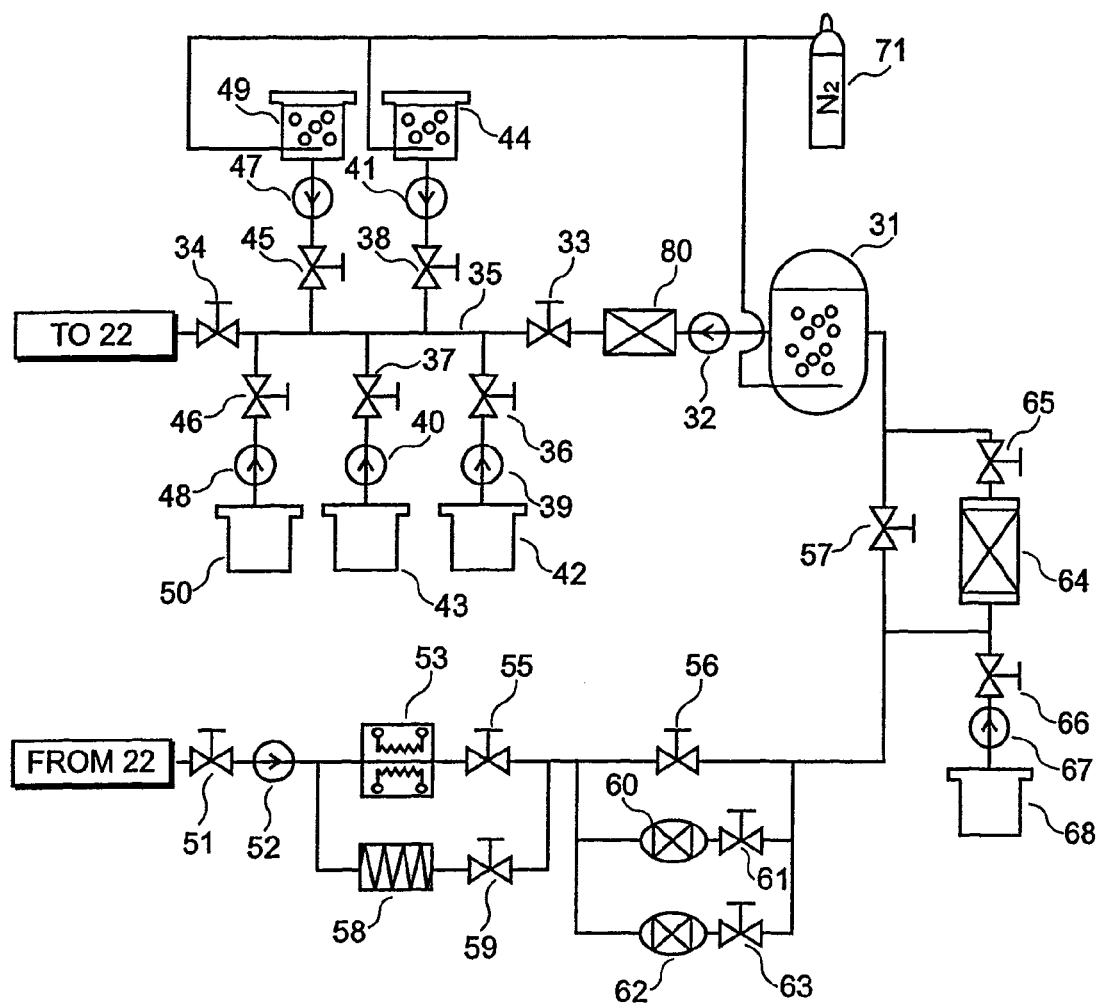
FIG. 11 is a schematic diagram of a system of another embodiment of a film forming apparatus according to the present invention.

FIG. 11 shows a system of another embodiment of the film formation apparatus 30 according to the present invention. In the present invention, a filter 80 for removing side reaction products is provided between the recirculation pump 32 at the exit side of the surge tank 31 and the valve 33, in addition to the embodiment shown in FIG. 10. In the magnetite film formation, iron (II) ion is adsorbed on an object surface to be treated, a part thereof is oxidized to iron (III) ion by oxidizer injected from the chemical tank 50 to form ferrite, and it grows as a film by repeating the adsorption and oxidization. However, in the solution being transferred, also, iron (II) ion reacts with oxidizer injected from the chemical tank 50, and a part thereof becomes iron (III) ion and turns into ferrite particles and iron (III) (ferric) hydroxide particles in the solution. Since those particles grow as time passes, they are easy to grow inside the surge tank 31 in which they stay for a long time. When the grown those particles are supplied again to the object portion that a film is to be formed, there is the possibility that they are taken in the magnetite film which is growing and uniform growth of the magnetite film is spoiled. Particularly, when ion (III) hydroxide is taken in, in some cases, radioactive cobalt is taken in when hematite is produced by dehydration reaction.

In order to make the magnetite film grow uniformly on the object portion surface, it is preferable to remove particle-shaped products grown by side reaction, and it is effective to install a filter 80 for removing side reaction products at the exit side of the surge tank 31 in which the particle-shaped products are easy to grow. Thereby, an amount of particle-shaped products grown by side reaction to the object portion to be treated decreases and the magnetite film easily grows uniformly.

Sixth Embodiment

Figure 12:
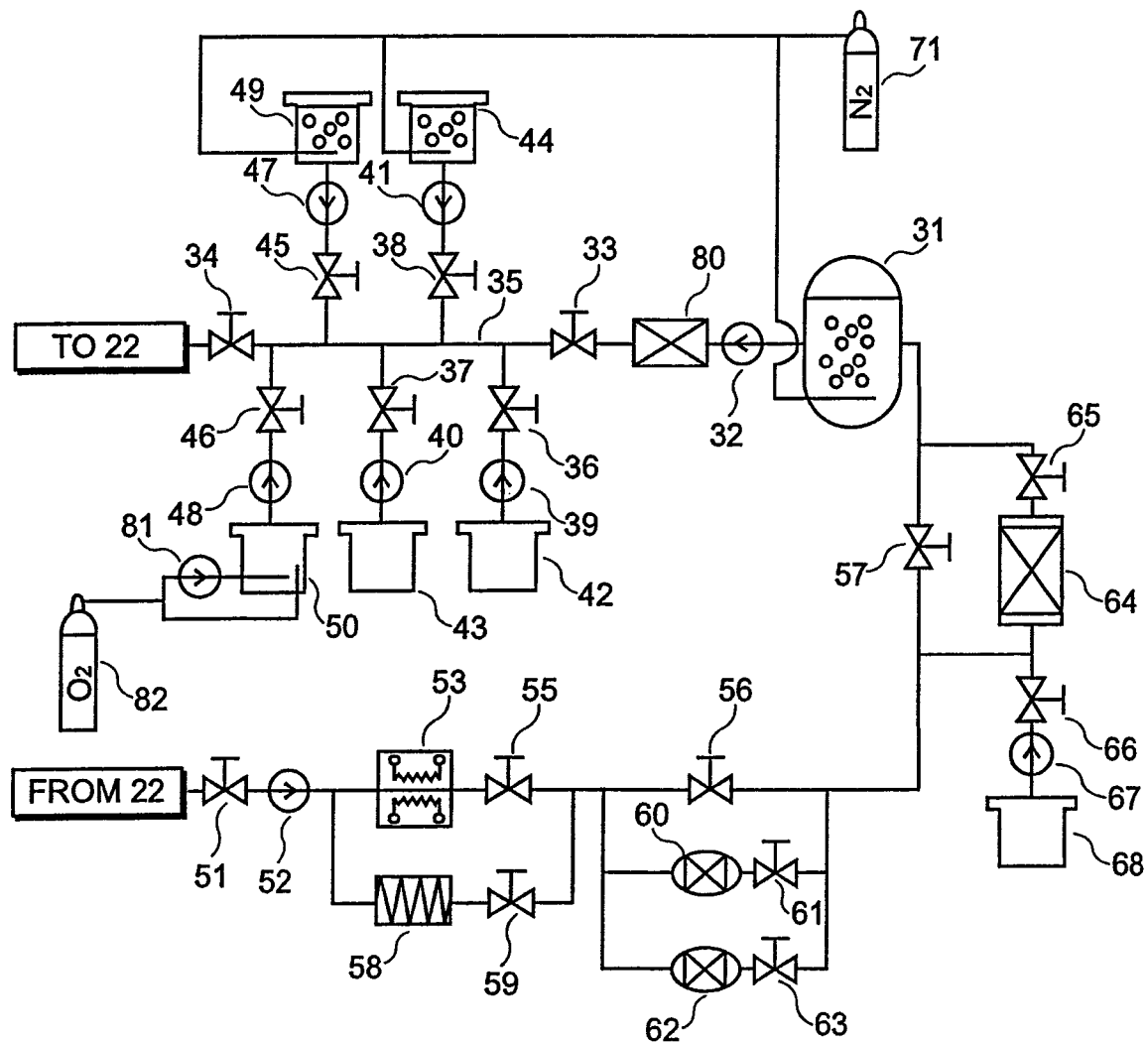
FIG. 12 is a schematic diagram of a system of another embodiment of a film forming apparatus according to the present invention.

FIG. 12 shows a system of another embodiment of the film formation apparatus 30 according to the present invention. The present embodiment is a concrete example in which oxygen saturated water is formed as oxidizer which is stored in the chemical tank 50, in addition to the embodiment shown in FIG. 11. As shown in FIG. 12, water is filled in the chemical tank 50, and while recirculating the water by a recirculation pump 81, oxygen-containing gas is injected into the recirculating water from oxygen-containing gas injection equipment 82, whereby oxygen saturated water at the oxygen concentration of the oxygen-containing gas is formed. The oxygen saturated water is used as oxidizer for magnetite film formation. Thereby, waste does not occur from the oxidizer, and it is possible to reduce an amount of waste by the amount corresponding to the waste that does not occur from the oxidizer.

Seventh Embodiment

Figure 13:
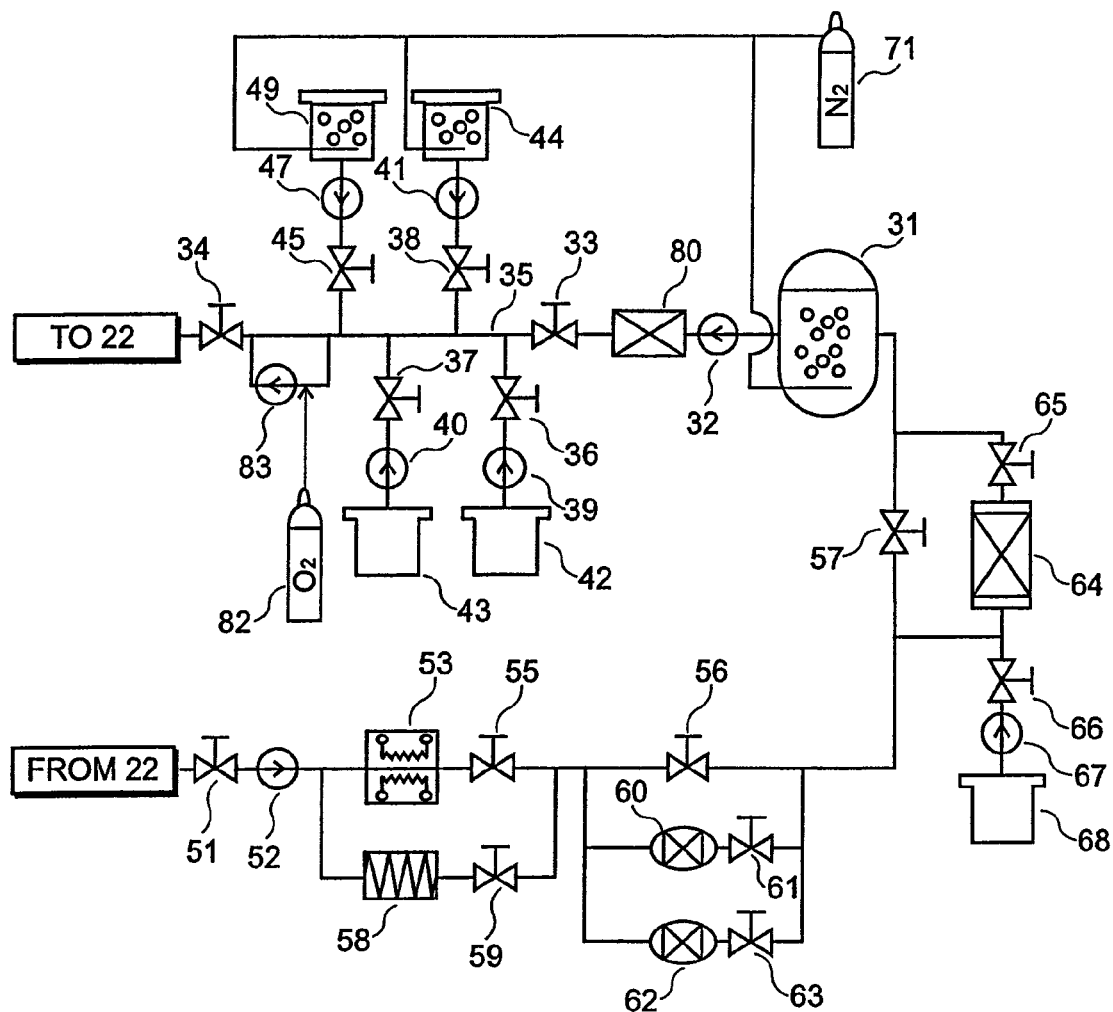
FIG. 13 is a schematic diagram of a system of another embodiment of a film forming apparatus according to the present invention.

FIG. 13 shows a system of further another embodiment of the film formation apparatus 30 according to the present invention. In the present embodiment, oxygen-containing gas is supplied to micro-bubble generation equipment 83 from the oxygen-containing gas injection equipment 82 and oxygen-containing gas micro-bubble is injected into the processing solution piping 35 from the micro-bubble generation equipment 83, instead of the chemical tank for oxidizer in FIG. 6. The micro-bubble generation equipment 83 is provided on branch piping branched from the processing solution piping 35 to supply a part of processing solution supplied to the object portion to generate micro-bubble, and the branched piping is formed so that the part of processing solution is mixed with the oxygen-containing gas supplied from the oxygen-containing gas injection equipment 82 at the branched piping, generates oxygen-containing gas bubble, and is returned to the processing solution piping 35. The air bubble micro-bubbled is very slow in rising velocity in liquid phase, so that it is not separated soon into gas and liquid phases as in usual air bubble, and the air bubble as it is flows along the liquid phase in the field that flow exists. Therefore, according to the present embodiment, the oxidizer reaches the object portion to be treated as micro-bubble of oxygen-containing gas.

Further, according to the present embodiment, since the oxygen contained in the micro-bubble does not react directly with iron (II) ion in liquid phase because the oxidizer of micro-bubble is used, it is possible to reduce an amount of iron (II) ion oxidized to iron (III) ion in liquid phase before reaching to the object portion to be treated, as compared with the sixth embodiment.

Eighth Embodiment

Figure 14:
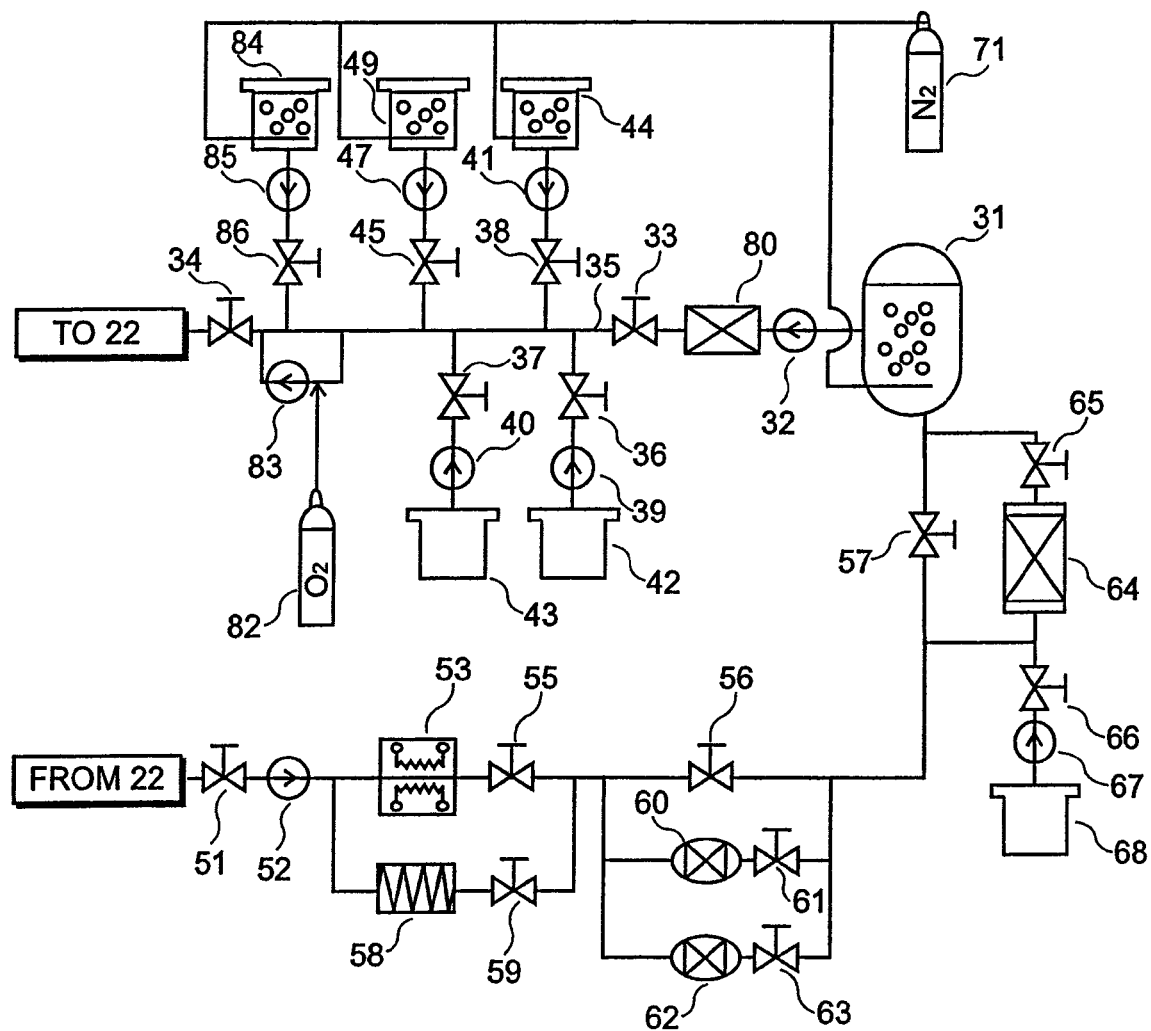
FIG. 14 is a schematic diagram of a system of another embodiment of a film forming apparatus according to the present invention.

FIG. 14 shows a system of further another embodiment of the film formation apparatus 30 according to the present invention. In the present embodiment, in addition to the embodiment shown in FIG. 13, ascorbic acid injection equipment is provided. The ascorbic acid injection equipment is constructed so that ascorbic acid solution is injected into the processing solution piping 35 from a chemical tank 84 storing ascorbic acid solution via a pump 85 and the valve 86. The ascorbic acid solution in the chemical tank 84 is bubbled by nitrogen from the nitrogen bubbling equipment 71, and dissolved oxygen is removed therefrom. The ascorbic acid injected in the processing solution piping 35 is mixed with processing solution containing bubble of oxygen-containing gas reaches to the object surface to be treated together with iron (II) ion and pH adjuster. Meanwhile, a part of iron (II) ion has oxidized to iron (III) ion by a part of dissolved oxygen dissolved in liquid from micro-bubble of oxygen-containing gas. However, according to the present embodiment, ascorbic acid exists, so that iron (III) ion is reduced to the iron (II) ion, and it is possible to reduce a consumption amount of iron (II) ion. In this manner, most of the injected iron (II) ion as it is reaches to the object surface to be treated and adsorbed. A part of the adsorbed iron (II) ion is oxidized by oxygen contained in micro-bubble, and causes ferrite forming reaction together with iron (II) ion adsorbed without being oxidized to form magnetite film.

Therefore, it is possible to form a magnetite film by using a chemical containing at least one of iron (II) ion and iron (III) ion instead of iron (II) ion in the present embodiment, and contacting the processing solution formed by mixing ascorbic acid as a reducer reducing iron (III) ion and a chemical adjusting the pH of the processing solution to 5.5 to 9.0 with a metal member surface.

Ninth Embodiment

Figure 15:
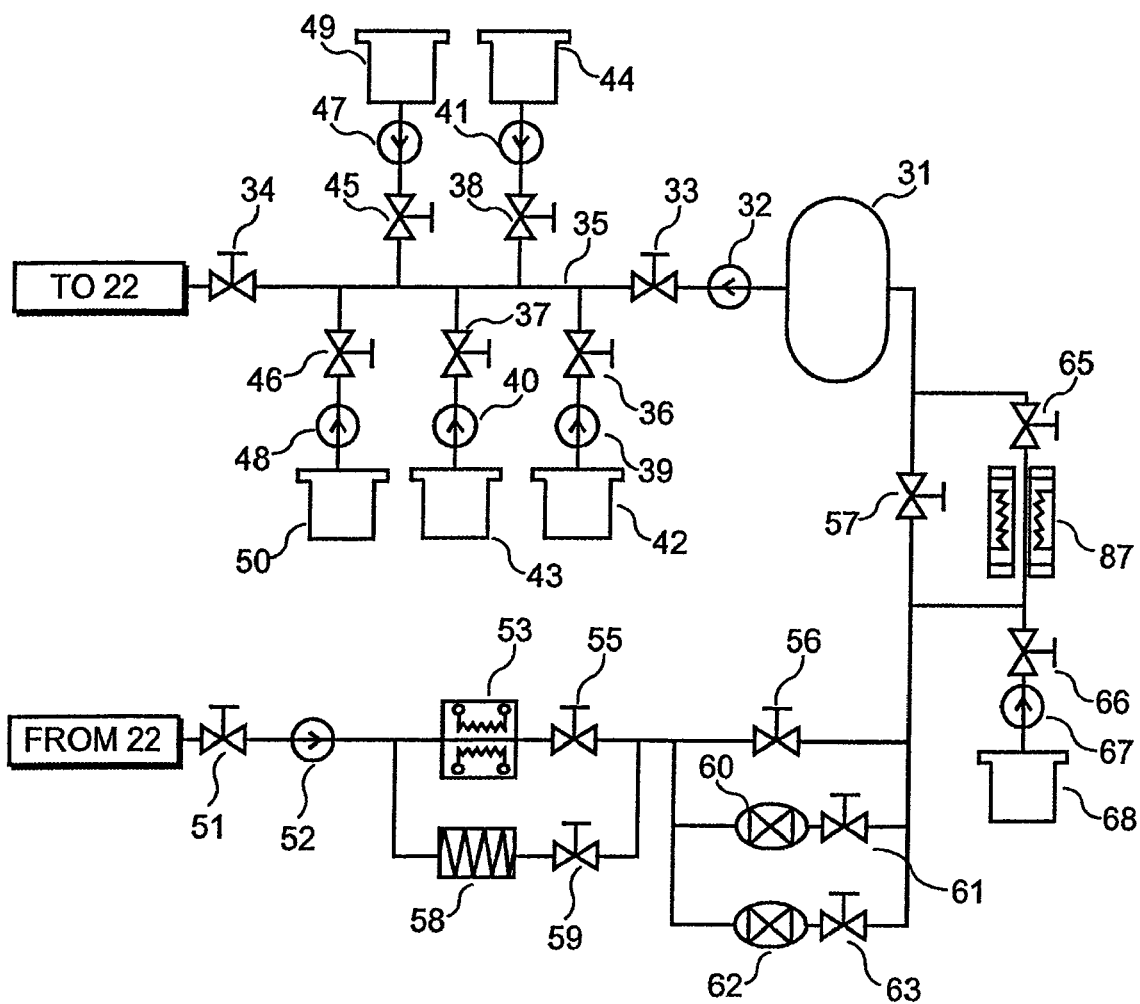
FIG. 15 is a schematic diagram of a system of another embodiment of a film forming apparatus according to the present invention.

FIG. 15 shows a system of further another embodiment of the film formation apparatus 30 according to the present invention. In the present embodiment, ultraviolet irradiation equipment 87 is used instead of the dissolution equipment 64 in FIG. 6. As in the first embodiment, in order to decompose formic acid and hydrazine after finishing of magnetite film formation, openings of the valve 57 and the valve 65 of the ultraviolet irradiation equipment 87 are adjusted, and a part of the processing solution is flowed into the ultraviolet irradiation equipment 87. At the same time, the valve is opened and the injection pump 67 is started, and the hydrogen peroxide in the chemical tank 68 is injected into the ultraviolet irradiation equipment 87. Thereby, a part of the hydrogen peroxide received ultraviolet irradiation produces OH radical, and the OH radical conducts oxidative decomposition of formic acid and hydrazine into carbon dioxide and water, and into nitrogen and water, respectively. As a result, it is possible to decompose the chemical contained in a waste solution after finishing magnetite film formation and to reduce a waste amount.

Tenth Embodiment

Figure 16:
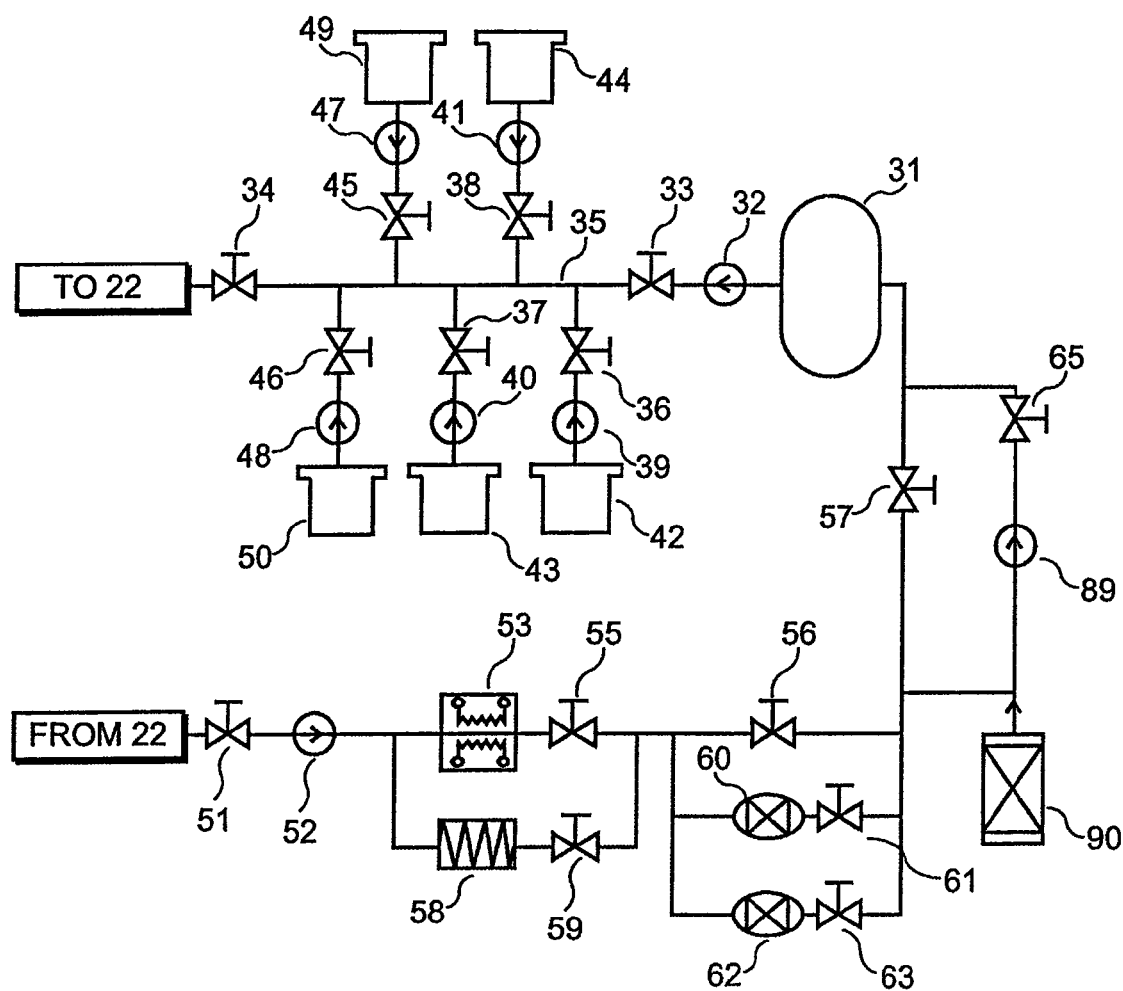
FIG. 16 is a schematic diagram of a system of another embodiment of a film forming apparatus according to the present invention.

FIG. 16 shows a system of further another embodiment of the film formation apparatus 30 according to the present invention. The present embodiment is characterized in that micro-bubble generation equipment 89 is used instead of the decomposition equipment 64 in the embodiment shown in FIG. 6. As shown in FIG. 16, the present embodiment is constructed so that ozone gas is blown in the micro-bubble generation equipment 89 from ozone gas supply equipment 90. As in the decomposition equipment 64, openings of the valve 57 and the valve 65 at the exit side of the micro-bubble generation equipment 89 are adjusted, whereby a part of the processing solution in the micro-bubble generation equipment 89 is passed through. Thereby, the ozone gas blown in the micro-bubble generation equipment 89 becomes ozone micro-bubble in the processing solution containing formic acid and hydrazine. The ozone dissolved in the processing solution directly decomposes oxidatively formic acid and hydrazine or formic acid and hydrazine are oxidatively decomposed by OH radical generated by a reaction of ozone and water to becomes carbon dioxide, nitrogen and water. Thereby, a waste amount is reduced by decomposing chemicals contained in the waste after finishing of magnetite film formation to gas and water.

Eleventh Embodiment

Figure 17:
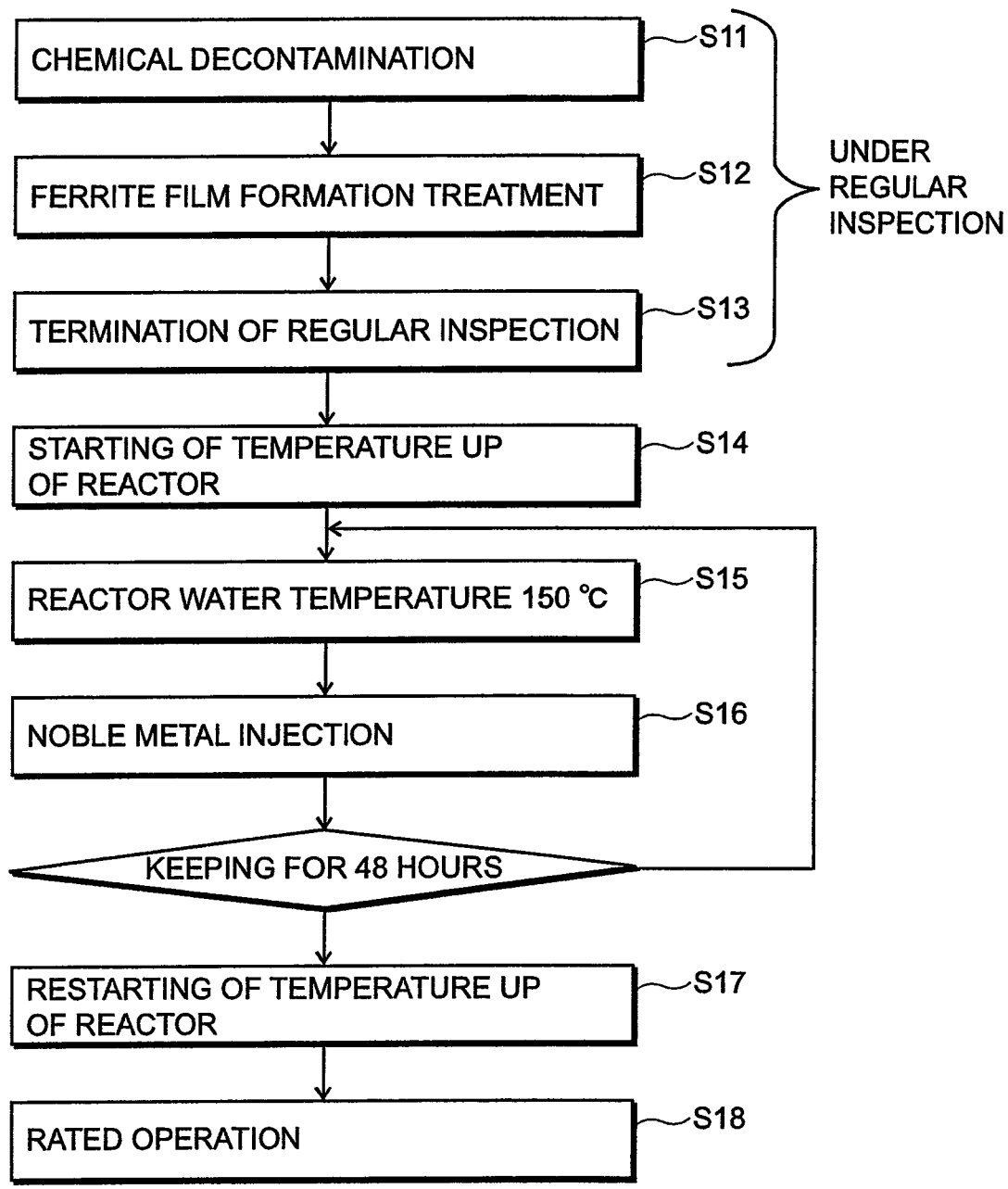
FIG. 17 is a flowchart showing a procedure for performing noble metal deposition treatment after forming of a ferrite film according to the present invention.

Further another embodiment according to the present invention will be described, referring to FIG. 17. FIG. 17 shows a flowchart showing a procedure for performing noble metal deposition treatment which is usually not conducted immediately after chemical decontamination. The noble metal deposition treatment is conducted for suppressing stress corrosion cracking of components of a nuclear reactor. Usually it is conducted using about 48 hours when the temperature of reactor water reaches to 150° C. from a starting time of stopping operation in time when the nuclear reactor is going to be stopped or intermediately stopped to a time when the nuclear reactor is stopped. The reason that the treatment is not conducted immediately after chemical decontamination is that noble metal is difficult to deposit on the nuclear reactor component surface from which an oxide film is removed by the chemical decontamination. The noble metal deposition treatment is conducted after an oxide film grows to some extent. The reason that it is conducted at 150° C. is that the efficiency to deposition is best as a result of studying of a noble metal deposition amount under various temperature conditions.

Namely, as shown in FIG. 17, magnetite film formation processing is conducted (S12) immediately after chemical decontamination (S11). Next, temperature elevation of the nuclear reactor is started (S13, S14) at the same time as an regular inspection terminates. After the temperature of reactor water is kept at 150° C. for 48 hours (S15), noble metal is injected (S16), and then temperature elevation of the nuclear reactor is restarted (S17) and the operation is shifted to the rated operation (S18).

In this manner, according to the present embodiment, the magnetite film of metal oxide is formed on the object surface to be treated by the magnetite film processing immediately after the chemical decontamination, so that a noble metal element is easy to be deposited by the noble metal deposition treatment. When the temperature of reactor water reaches to 150° C. from starting of the nuclear reactor, injection of a noble metal compound including platinum and rhodium is started and the condition is kept for about 48 hours, whereby it is possible to conduct the noble metal deposition treatment.

Twelfth Embodiment

Figure 18:
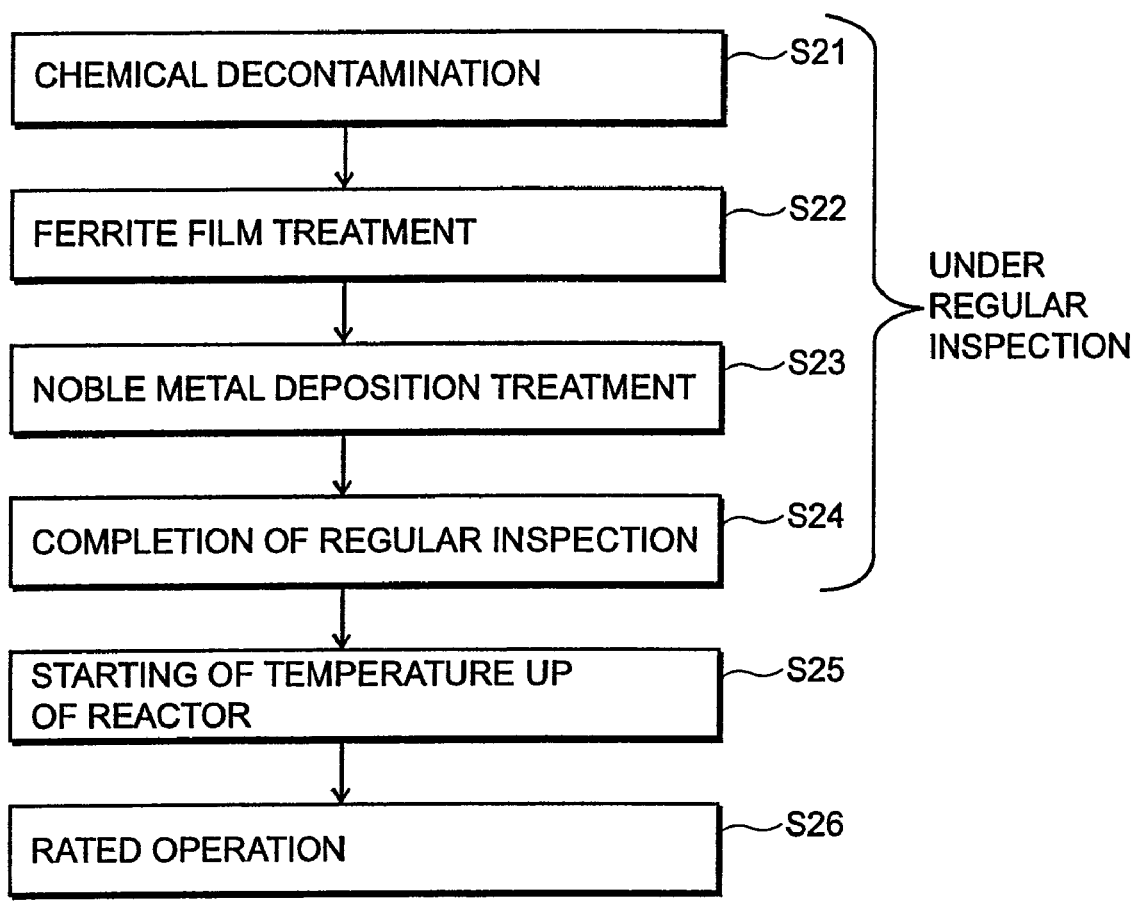
FIG. 18 is a flowchart showing another procedure for performing noble metal deposition treatment after forming of a ferrite film according to the present invention.

FIG. 18 shows a flowchart showing another procedure for performing noble metal deposition treatment. In the present embodiment, after magnetite film processing is finished, immediately, a noble metal deposition treatment is conducted by using the film formation apparatus 30 as it is. As noble metal injection equipment, the oxalic acid injection equipment as shown in FIG. 6, for instance can be used. That is, a solution of a noble metal compound containing platinum and rhodium is contained into the chemical tank 43, and the solution is injected into the processing solution by using the injection pump 40. The temperature rises only to about 100° C., however, since no nuclear fuel is contained in the processing solution, it is unnecessary to worry about influence on zircalloy, so that it is possible to raise the concentration higher than the usual noble metal deposition treatment and extend the treatment time, whereby it is possible to deposit noble metal of a prescribed amount.

Namely, as shown in FIG. 18, after chemical decontamination is conducted (S21), immediately, film formation processing of magnetite film is conducted (S22), successively, noble metal deposition treatment is conducted (S23), then elevation of the temperature of the nuclear reactor is started at the same time as the regular inspection finishes (S24, S25) and the nuclear reactor operation is shifted to the rated operation (S18).

The present invention is based on Japanese Patent Application No. 2004-214541, filed on Jul. 22, 2004, and including its specification, claims, drawings, and abstract. The disclosure of the above application is incorporated herein by reference in its entirety.

What is claimed is:

1. A method of suppressing deposition of radionuclides on components of a nuclear power plant comprising:
   connecting a pipe having a pump to piping of the nuclear power plant;
   removing contaminants including an oxide film deposited on an inner surface of the piping by chemical decontamination;
   forming a ferrite film on the inner surface of the piping by supplying a liquid, which is pressurized by the pump and has a temperature adjusted within 60° C. to 100° C. by a heating apparatus provided on the pipe and a pH adjusted to within 5.5 to 9.0, comprising iron (II) ions, and a chemical for oxidizing the iron (II) ions to iron (III) ions into the piping after connecting the pipe to the piping, and after the chemical decontamination; and
   depositing noble metal on the ferrite film by supplying a solution including a noble metal to the piping through the pipe after formation of the ferrite film,
   wherein the steps of connecting the pipe, removing the contaminants, forming the ferrite film, and depositing the noble metal are carried out after the nuclear power plant is stopped and before starting the nuclear power plant.

2. The method of suppressing deposition of radionuclides on components of a nuclear power plant according to claim 1, further comprising circulating the liquid through a circulation loop formed by the pipe and the piping.

* * * * *